(12) United States Patent
Stein

(10) Patent No.: US 6,245,167 B1
(45) Date of Patent: Jun. 12, 2001

(54) PLATEN PRESS FOR LAMINATED PLASTIC CARDS

(75) Inventor: Wolfgang Stein, Freundenstadt (DE)

(73) Assignee: Robert Bürkle GmbH, Freudenstadt (DE)

( * ) Notice: Subject to any disclaimer, the term of this patent is extended or adjusted under 35 U.S.C. 154(b) by 0 days.

(21) Appl. No.: 09/351,566

(22) Filed: Jul. 8, 1999

(30) Foreign Application Priority Data

Jul. 13, 1998 (DE) .............................. 198 31 377

(51) Int. Cl.[7] ...................................... B30B 15/22
(52) U.S. Cl. .............. 156/64; 156/228; 156/288; 156/358; 156/583.1
(58) Field of Search .................. 156/64, 228, 288, 156/358, 580, 583.1

(56) References Cited

U.S. PATENT DOCUMENTS

| | | | |
|---|---|---|---|
| 5,688,352 | * | 11/1997 | Ceraso ................................ 156/228 |
| 5,755,916 | * | 5/1998 | Ceraso ................................ 156/288 |
| 5,807,455 | * | 9/1998 | Giordano et al. ..................... 156/228 |
| 5,853,528 | * | 12/1998 | Maeda et al. ......................... 156/474 |
| 5,891,281 | * | 4/1999 | Giordano et al. ...................... 156/64 |

FOREIGN PATENT DOCUMENTS

| | | |
|---|---|---|
| DT 1 577 195 | 7/1970 | (DE) . |
| DE 38 44 498 A1 | 7/1990 | (DE) . |
| EP 0 262635 A2 | 4/1988 | (EP) . |

\* cited by examiner

Primary Examiner—James Sells
(74) Attorney, Agent, or Firm—Akin, Gump, Strauss, Hauer & Feld, L.L.P.

(57) ABSTRACT

The invention involves a platen press for manufacturing laminated plastic cards, in particular contactless cards with integrated electronic components. In the press, above the uppermost platen, a heating plate is arranged which is mounted to be vertically displacable, and functions as a movable stop for the lifting movement of the press.

9 Claims, 5 Drawing Sheets

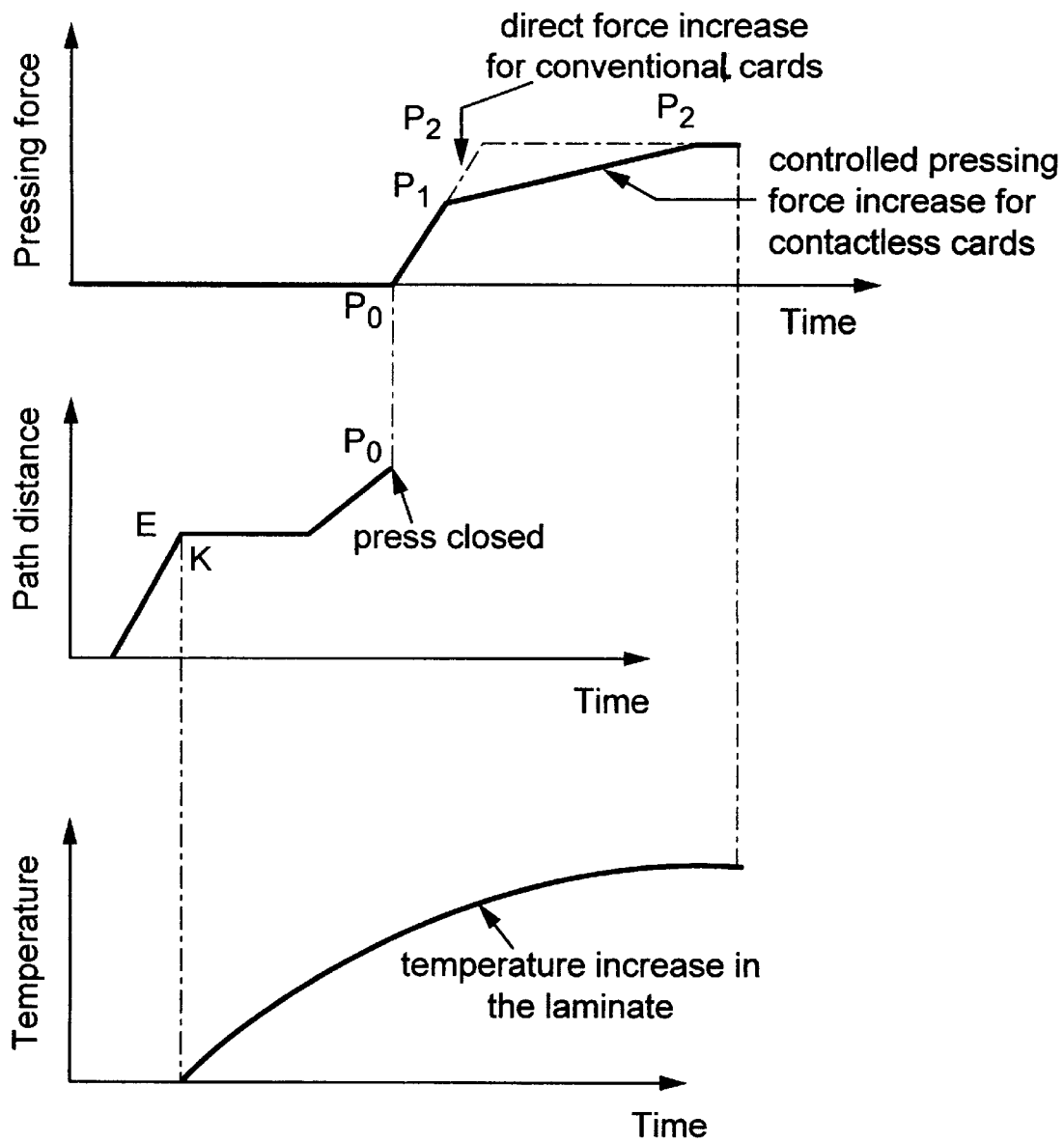

E = sensor for switching off the closing path after placement on the uppermost heating plate K = contact of the heating plates on the press material at small pressure; without pressing force $P_0$ = remaining closing path until the uppermost plate lies on the upper press table $P_1$ = 1st pressing force = minimum pressing force $P_2$ = final pressing force during continuous pressing force build-up from $P_1$ to $P_2$

Fig. 7

PLATEN PRESS FOR LAMINATED PLASTIC CARDS

The invention relates to a multistage (platen) press for manufacturing laminated plastic cards, such as check cards, credit cards and the like, in particular contactless cards with integrated electronic components, wherein several film stacks to be pressed lie on platens of the press, which are arranged on top of each other and can be vertically displaced, wherein each platen includes a heating unit and at least a few platens are provided with a specific weight equalization, and the pressing operation proceeds by lifting the platens until they rest on each other under pressure. In addition, the invention relates to a process for manufacturing plastic cards of this type.

In conventional laminated plastic cards, such as check cards, credit cards, telephone cards, which consist of several laminates pressed together under the influence of heat, the electronic components, such as data storage media, magnetic strips, or chips, are placed in the outer areas of the card. However, in the so-called contactless cards and similar cards they are no longer arranged uncovered, but instead are integrated in the interior of the card. The input or output of data, or in general the signal transfer, occurs therein in a contactless manner by induction. For this purpose, the electronic component usually has an antenna, which is likewise covered and runs inside the card.

In both types of cards, the electronic components are embedded or pressed-in in such a way that, on the one hand, a total bond of the laminate results and, on the other hand, damage to the electronic components during the press-in operation is ruled out.

In order to prevent a material displacement of the inner layers by the electronic component, in particular the chip and its carrier, suitable openings or recesses are provided in the inner layers, into which the electronic components fit.

Tests by the applicants have shown that tolerances in the electronic components, on the one hand, and the plastic films, on the other hand, are responsible for either the mentioned openings not being completely filled by the electronic components or the electronic components overhanging, and thus resulting in a material displacement or material compaction. Localized depressions on the laminate surface thereby result from the unfilled openings, whereas material displacements become apparent from slightly raised areas on the surface.

Proceeding from this background, the object of the present invention is to eliminate the problems mentioned, in particular to provide a platen press with which absolutely planar card surfaces can then be obtained, even if the aforementioned tolerances occur, are exceeded or become negatively mutually amplified in the components and plastic films. As a result, plastic cards should thus be able to be generated, which are characterized by an absolutely flat, error-free decorative print.

This object is achieved according to the invention in that above the uppermost platen of the platen press, a heating plate is arranged which for its part is mounted to be vertically displaceable and acts together with a pressure or path sensor to control the pressing operation, that the platens lying above the pressing table are each connected to a separate lifting element to create an individual weight equalization, and that the aforementioned lifting elements are each connected via their own control units to a pressure medium source.

Thus, according to the invention, the upper stop, which limits the lifting movement of the platens during the pressing operation, is formed by a movable heating plate. In this way, the pressure build-up can be controlled during the pressing operation in a substantially more sensitive manner than with a fixed stop.

In addition, all platens, except for the platen lying on the pressing table, are respectively connected to their own lifting element, and each of these lifting elements is connected via its own control component to a common pressure medium source. For each platen the lifting force can thereby be adjusted individually and, indeed, either with a fixed pre-adjustment or as a function of the individually detected weight of each platen. The desired press-on pressure can thereby be obtained for each platen.

Preferably, the heating plate acts together with a pressure or path sensor, so that in the heating phase, as well as after reaching the thermoplastic condition of the film stack, an exact control of the pressing operation is ensured. In this manner, one can at first drive the press only up to the point where all platens, with the film stacks lying on them, are in contact with each other, and the uppermost uncovered heating plate, which functions as a movable stop, is lifted only to the point where the pressure or path sensor comes to act. At this stage, which is comparitively almost pressureless, the film stacks are heated up until reaching the thermoplastic condition, and only after that does the actual pressing operation occur and, indeed, at such a low pressure gradient that the plastic material can fill cavities in the vicinity of the electronic component and, when the electronic component overhangs, can flow away without exerting critical reaction forces on the electronic component.

In order to ensure an especially sensitive driving together of the platens until they lie on the uppermost heating plate, it is recommended to connect them likewise to a lifting element, which causes a specific weight equalization for the upper heating plate. The heating plate thus does not act with its entire tare weight on the film stack located beneath it, but instead acts only with a clearly reduced force, whose strength can be controlled via the lifting element. This lifting element can be activated just like the lifting elements for the platens by motor, hydraulically, mechanically, but preferably pneumatically, and can be connected, for example via a control unit, to a pressure medium source.

For cost reasons, it is recommended to construct the heating plate in a manner similar to the platens lying beneath it. This also applies in regard to the lifting element allocated to it to create an individual weight equalization.

It is generally to be noted for the weight equalization that using it not only allows the weight of the table plates or heating plates, but also the film stack lying on it, to be more or less equalized. The so-called lifting elements each have a separate control unit for this purpose.

In spite of the described weight equalization, undesired load peaks can occur on the film stack when moving the pressing table up and, indeed, each time that a film stack moving upwards strikes against the next highest platen still found at rest, since this platen must then be accelerated from zero speed to the lifting speed. So that the forces of inertia to be overcome here are reduced, it lies within the framework of the invention to connect all platens with an individual, separate lift drive, which then already lifts the next highest platen upwards before the platen arriving from below collides. The platens are thereby no longer exposed to the full speed difference when they collide. This additional individual drive can be so designed that all platens move up simultaneously, wherein the speed of the lower platens must be higher than that of the upper platens, so that all platens reach their upper end position at approximately the same time.

This simultaneous drive of all platens at graduated speeds can occur, for example, via rotating traction mechanisms such as chains or the like, whose drive gears have different diameters. All drive gears can thereby be arranged on the same shaft, but because of their different diameters, they generate different rotational speeds on their respective traction mechanism.

Instead of this, however, the drive can also occur via the already mentioned lifting elements, in such a manner that these not only cause a static weight equalization, but also trigger a real lifting movement on each platen, controlled via their control units, before the adjacent platen arriving from below strikes. After striking, the function of the lifting element can be reduced again to the weight equalization.

Additional features and advantages of the invention can be gathered from the remaining claims and the following description of one embodiment on the basis of the drawing; shown therein:

FIG. 7 is a flow diagram of the pressing operation.

Figure 1:
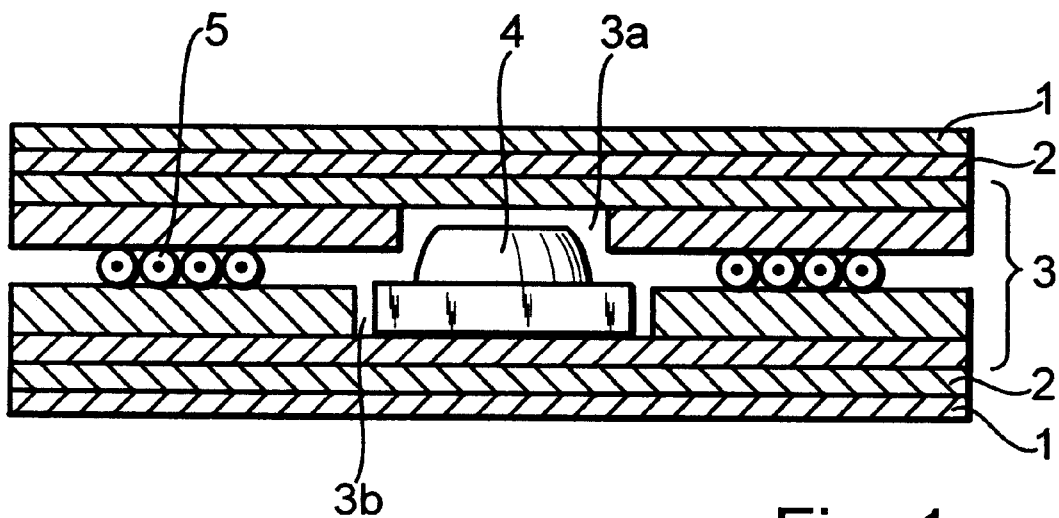
FIG. 1 is a cross section through a contactless card with an antenna and integrated chip in unpressed condition.
Figure 2:
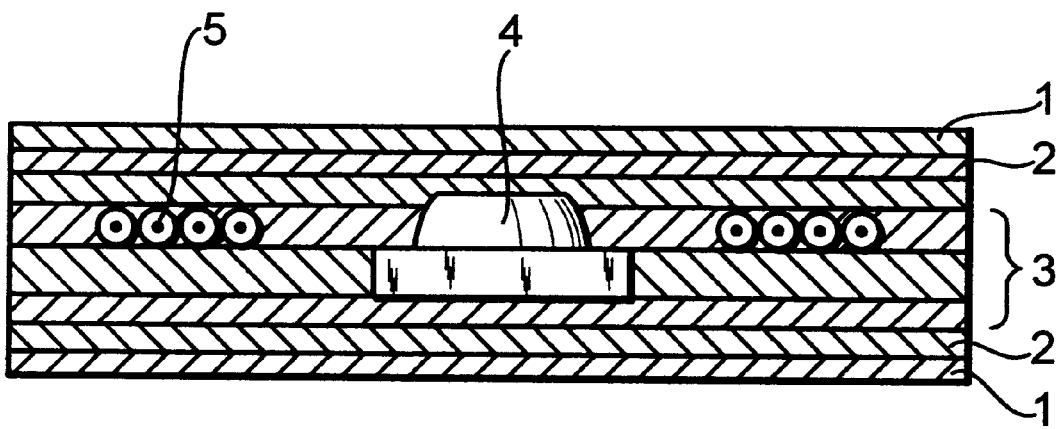
FIG. 2 is the same cross section in pressed condition.

According to FIGS. 1 and 2 the contactless cards consist of an upper and lower cover film 1, to each of which a decorative film or white film 2 is connected inwardly, while several inner films 3 run between the decorative or white films. These inner films are provided locally with recesses 3a or 3b, in order to house therein the electronic component 4, in particular a chip module with its module carrier. In general, an antenna 5 is bonded on the electronic component 4. It can also be placed in a suitable recess of an inner film 3, but it is usually simply placed on the upper side of a film.

FIG. 2 shows the same contactless card in the pressed condition. Here, the cavities previously present between the electronic component and the plastic film bordering it are almost completely eliminated and the electronic component with its antenna, and possibly other accessories, is surrounded on all sides by the plastic films. At the same time, the films are also firmly connected one below the other by the pressing operation. It is desired herein that the material displacement and material compaction taking place in the area of the electronic component not appear at all or only appear in a minimal way in the decorative film 2. Therefore, soft films having low melting points and/or a low density are partially used particularly for the inner films 3.

Figure 3:
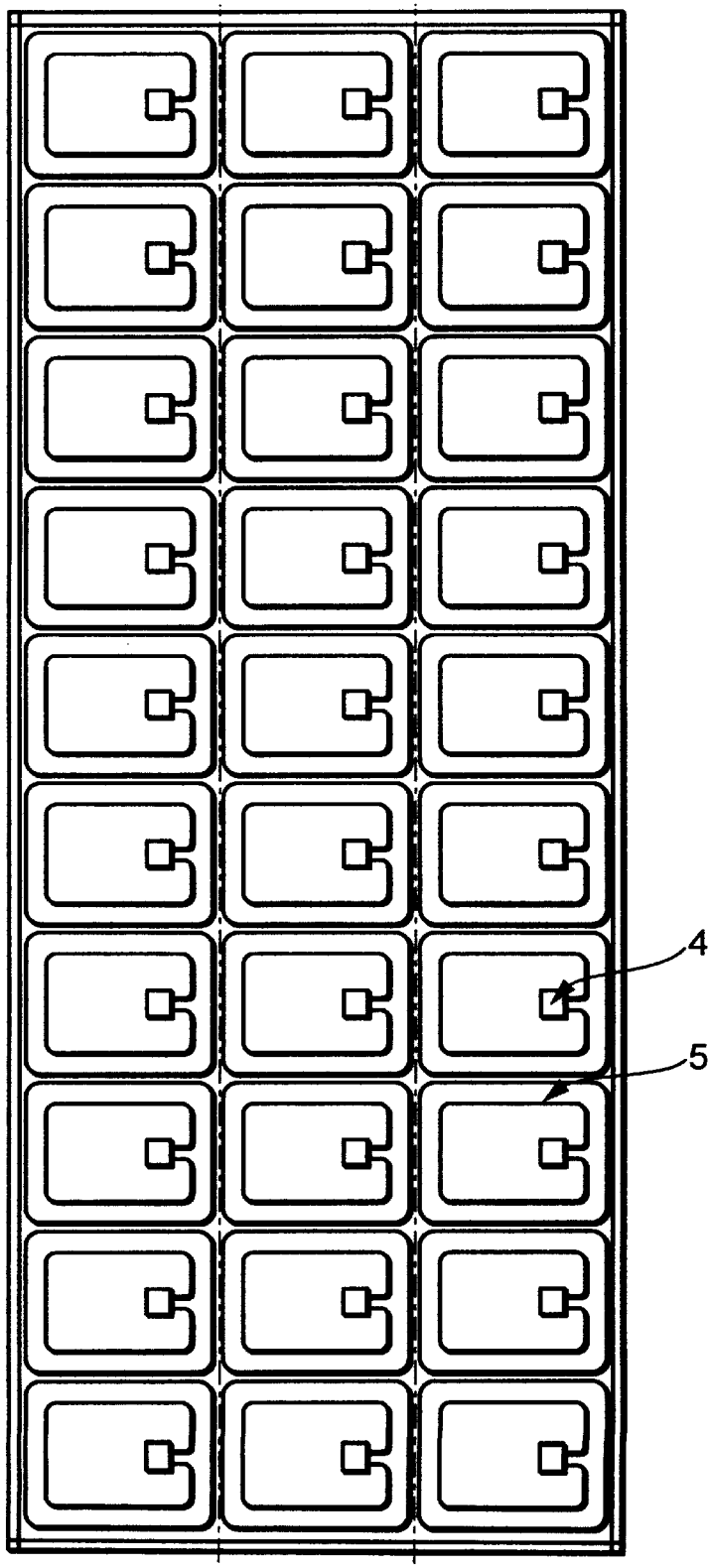
FIG. 3 is the top plan view of a transport plate covered with a laminate sheet.

In FIG. 3 it can be recognized that a laminate sheet contains numerous, attached, individual card formats arranged next to each other, wherein the number of cards complies above all with how the decorative print is applied and how the pre-production occurs for placement of the electronic components. In the embodiment according to FIG. 3 three rows each having 10 individual card formats are thus accommodated in a laminate stack, wherein for the realization of the invention it does not matter whether the cards are already separated prior to the pressing operation or are punched out first at that time.

Figure 4:
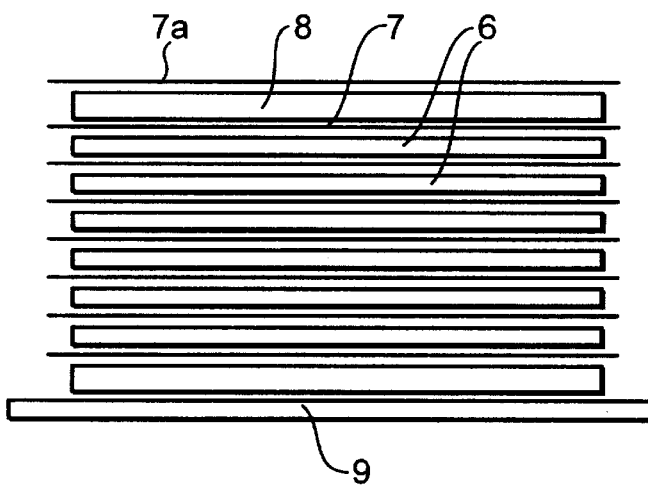
FIG. 4 is a cross section through a multi-layer press packet.

From FIG. 4 it can be recognized that several of the film stacks shown in FIG. 1 or 2 can be stacked on top of each other in the same platen of a press, in order to increase the card output per platen. The film stacks 6 are separated from each other in this case by press plates 7, respectively, so that they do not stick together during the pressing operation. Between the upper press plate 7 and the cover plate 7a, an additional press pad 8 is usually arranged for a more uniform print and temperature distribution.

A press packet of this type is arranged on a transport plate 9, which makes easier the handling and transport of the press packet. In general, the individual platens of the press are each occupied by a press packet of this type, so that a plurality of cards can be manufactured with a single pressing operation.

Figure 5:
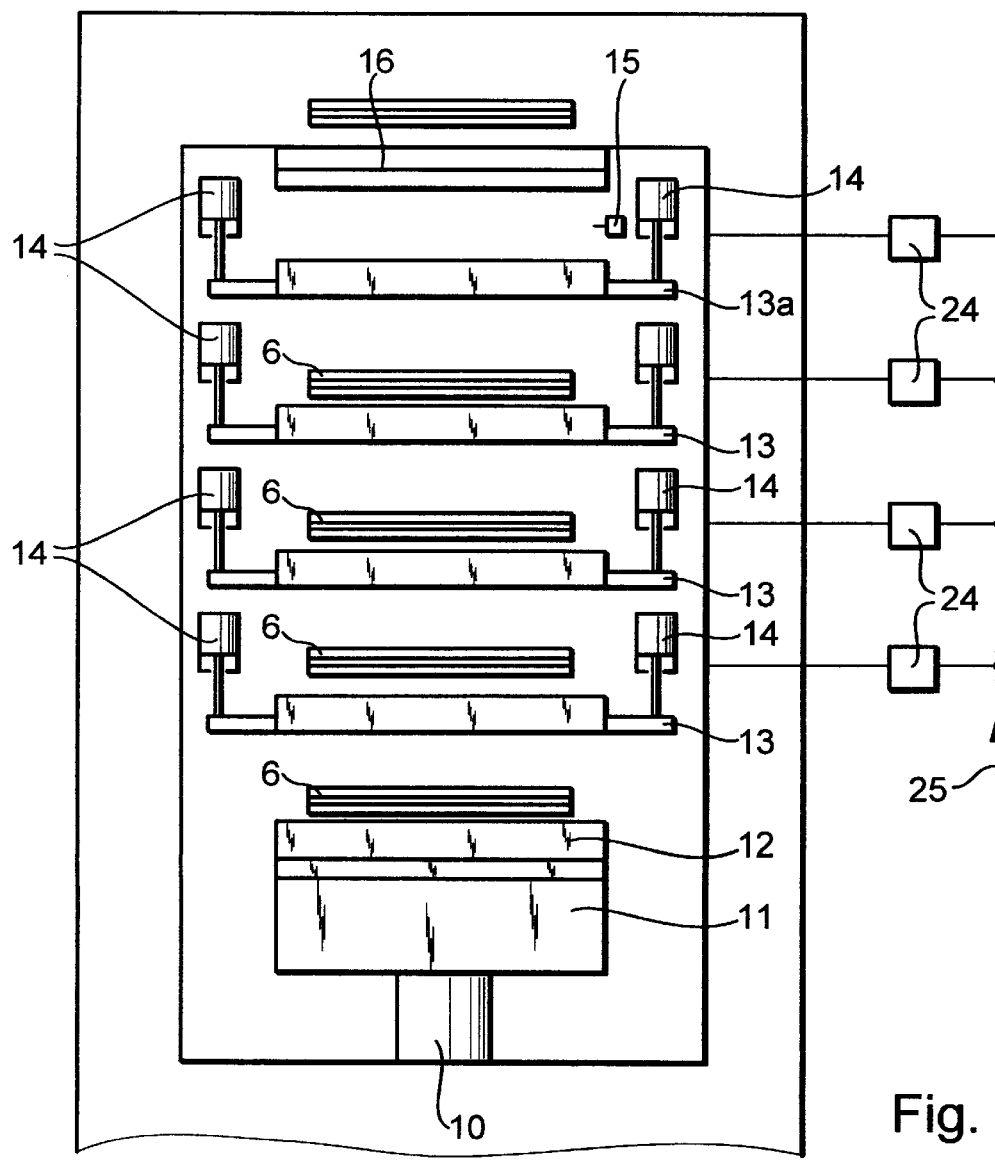
FIG. 5 is a schematic view of the press with hydraulic closing mechanism.

The press itself is depicted in FIG. 5. It consists of a lower press piston 10, which carries a press table 11 having a heatable table plate 12. On this table plate 12 lies the first film stack 6.

Spaced above the table plate, several vertically movable platens 13 are arranged, which each have a heatable table plate and which, in their lowered position shown, are spaced apart from one another approximately just as far as the lower platen 13 from the table plate 12. Each of these platens 13 carries a press packet 6 according to FIG. 4.

Spaced above the uppermost platen 13, a vertically movable heating plate 13a is arranged, which indeed appears similar to the described platens, but is not specified to receive a press packet, and instead functions as a movable stop during the pressing operation. Spaced above that the rigid upper press part 16 is located.

The actual pressing operation is accomplished by moving the press piston 10 upwardly. With this lifting movement the film stack located on the table plate 12 moves first to the lowest platen 13, caries this along upwards until reaching the next platen, so that in the course of the continued lifting movement, finally, one platen is lifted after the other. It is significant in this process that all platens 13 are connected to a weight equalization 14, which here, however, is only depicted schematically. It makes certain that the load of the film stacks is not dependent on the number of platens located above them, but instead for all platens is equally small as possible and is on the order of magnitude of approximately 10 kg to 30 kg. In practice, this weight equalization is preferably realized by pneumatically acting lifting elements, which are supplied from a common pressure medium source 25 via individually allocated control units 24 and generate an upward opposing force that does not completely correspond to the respective platen weight. This has the result that merely by driving up the platens, a secure resting of the press packets against the heating plates of the platens 13 located above them or on the uppermost heating plate 13a, and thus a good heat transmission is created.

In addition, the lifting elements can, however, also be used for the purpose of damping the impact shock that occurs each time by the collision of the lower platen or platens moving up against the platen located above. To do this, the lifting elements are guided in such a manner one after the other from bottom to top, according to the progression of the lifting movement of the press piston 10, that each platen is driven upwards shortly before the collision of the lower platen(s), until it has approximately the speed of the platen(s) coming from below. When the platen(s) coming from below has(have) reached the platen arranged above, the function of the aforementioned upper lifting element is reduced again to that of weight equilization. It is not necessary in the process to reach a total speed matching prior to driving the platens together; a distinct reduction of the speed difference is also already helpful.

Depending on the weight of the heating plate 13a, this can also be provided with a weight equalization 14, which is not absolutely necessary, however, since its weight is uniformly distributed on all of the press packets located below it. Moreover, the main purpose of the upper heating plate 13a consists in its function as a movable stop. It can namely be driven several millimeters to centimeters upwardly, without the pressure load of the press stack changing by this to any significant degree. One is thus in a position to move the press pistons 10 up to close all platens without thereby generating an incalculable pressure increase in the film stacks.

So that the lifting movement of the press piston 10 is terminated upon reaching the upper heating plate 13a, the heating plate 13a acts together with a path sensor 15. It activates as soon as the upper press stack lifts the heating plate 13a out of its lowered position, and it interrupts further lifting movement. In this position of the press, the film stacks 6 are heated almost without pressure by the adjacent heating plates below and above, until the inner lying plastic films 3, which should flow around the electronic component 4, have reached approximately the thermoplastic condition. This can be monitored by time or temperature measurement.

Then, the actual pressing occurs by further driving up the press piston 10, so that the press upper part 16 is effective as a fixed stop. This driving up is accomplished, however, in contrast to the prior art, not by a constant, steep pressure increase, but instead by a delayed, even pressure increase. This pressure increase is controlled by the system control, and the path sensor 15 can also be called upon for this purpose.

Figure 6:
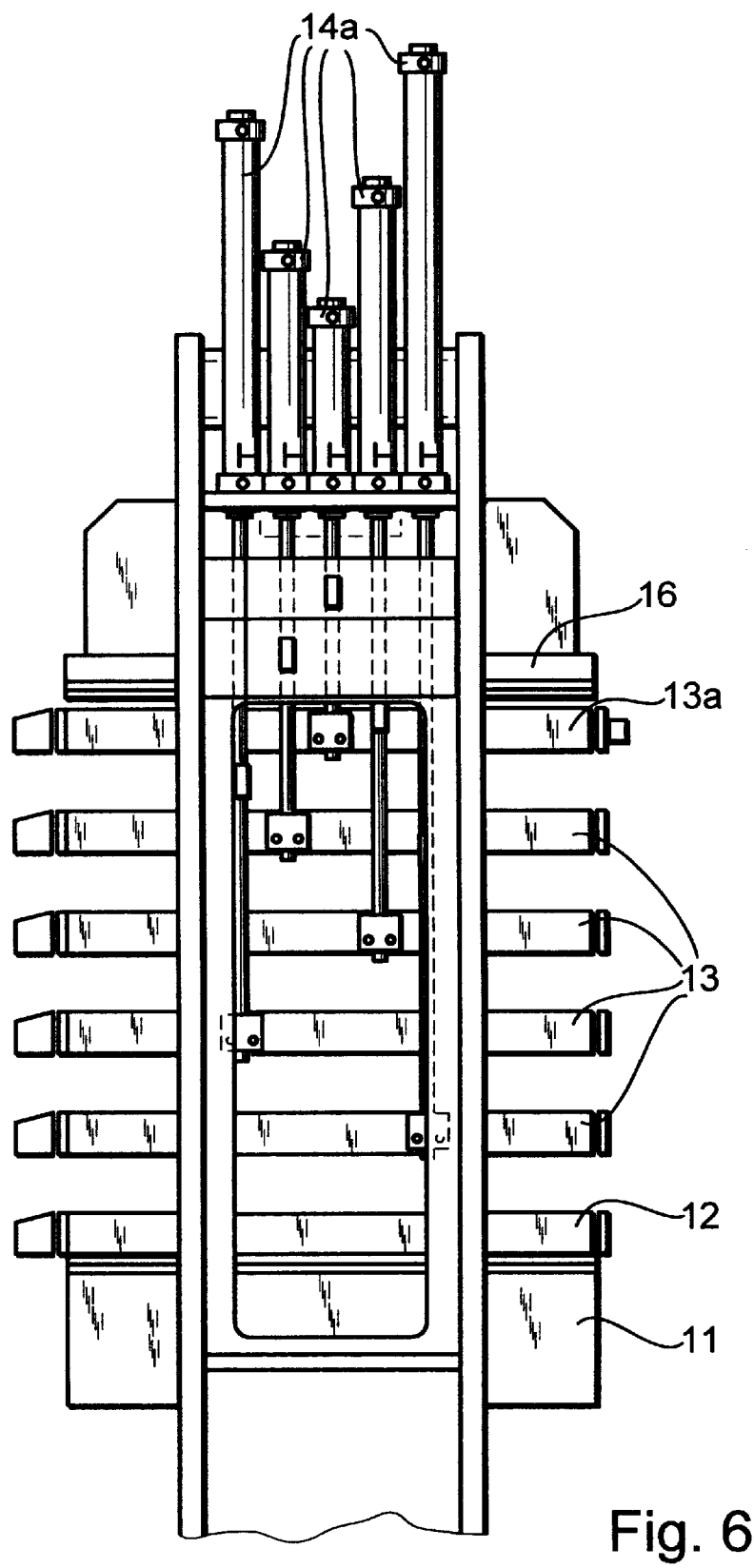
FIG. 6 is a view of the press with the weight equalization.

FIG. 6 shows the weight equalization, previously only shown schematically, in the form of individual cylinder-piston units 14a. These cylinder-piston units are different in length, since the lower platens 13 must perform much larger lifting movements than the upper platens.

Additional details of the pressing operation can be gathered from the flow diagrams in FIG. 7.

In the middle diagram the lifting movement of the press piston 10 is applied over time. One recognizes that the press piston at first drives up until reciprocal contact of the individual platens, namely until point K. Then, the sensor 15 is activated by the uppermost heating plate 13a and further lifting movement is interrupted, so that the plastic films have time to heat up on the pre-heated plates. Logically, one recognizes in the temperature/time diagram lying below that the start of the temperature increase in the laminate.

After a certain heat-up time, the plastic films of at least the inner layers 3 have then reached the thermoplastic condition. The press is then closed and the press piston 10 travels further upward, until the upper heating plate 13a rests on the press upper part 16 and the point $P_0$ is reached.

Then, the actual pressing operation begins, for which purpose reference is made to the upper diagram. One recognizes that the pressing force at first increases sharply to a value $P_1$, after that, however, breaks off and continues to climb at a distinctly reduced pressure gradient until the end pressure $P_2$. By this controlled pressure force increase it is ensured that the electronic components cannot be damaged during pressing.

It is within the framework of the invention to operate the press at a reduced ambient pressure so that air inclusions can be eliminated between the films.

What is claimed is:

1. Process for pressing laminated plastic cards such as check cards, credit cards, and the like, in particular, contactless cards with integrated electronic components, wherein several film stacks to be pressed are placed on platens (13) of the press, which are arranged above one another and can be vertically driven together, wherein each platen (13) is heated, and at least a few platens are provided with a specific weight equalization and the pressing operation is accomplished by lifting the platens until they rest on each other under pressure, characterized in that, the pressing operation is accomplished in multiple stages and the plastic films are heated at first nearly without pressing force until reaching a thermoplastic state, and only after that is the pressure increased up to the maximum pressure.

2. Process according to claim 1, characterized in that, the pressing pressure at first increases at a small pressure gradient and after that at a high pressure gradient.

3. Process according to claim 1, characterized in that, the pressure increase is controlled via a controller after reaching the thermoplastic state when the press is closed.

4. Process according to claim 1, characterized in that, the platens (13) are each connected to their own lifting element (14) and this lifting element (14) lifts its platens (13) upward before the platens coming from below strike, so that the impact is damped.

5. Platen press for manufacturing laminated plastic cards such as check cards, credit cards, and the like, in particular, contactless cards with integrated electronic components (4, 5), wherein several film stacks (6) to be pressed lie on platens (13) of the press, which are arranged above one another and can be vertically driven together, wherein each platen (13) includes a heating unit and at least a few platens are provided with a specific weight equalization (14) and the pressing operation is accomplished by lifting the platens (13) using a press table (11, 12) until the platens rest on each other under pressure, characterized in that, above the uppermost platen (13) a heating plate (13a) is arranged, which is mounted to be vertically displaceable and acts as a movable stop for the lifting movement of the press, that the platens (13) lying above the pressing table (11, 12) are each connected to their own lifting element (14) to create an individual weight equalization, and that the aforementioned lifting elements (14) are each connected via their own control units (24) to a pressure medium source (25).

6. Platen press according to claim 5, characterized in that, the heating plate (13a) acts together with a pressure or path sensor (15) to control the pressing operation.

7. Platen press according to claim 5, characterized in that, the heating plate (13a) is connected to a lifting element (14) to create a specific weight equalization.

8. Platen press according to claim 7, characterized in that, the lifting element (14) is connected via a control unit (24) to a pressure medium source (25).

9. Platen press according to claim 1, characterized in that, the heating plate (13a) has substantially the same construction as the platens (13) lying below it.

* * * * *

UNITED STATES PATENT AND TRADEMARK OFFICE
CERTIFICATE OF CORRECTION

PATENT NO. : 6,245,167 B1
DATED : June 12, 2001
INVENTOR(S) : Wolfgang Stein

It is certified that error appears in the above-identified patent and that said Letters Patent is hereby corrected as shown below:

The filing date of the application should read as follows -- July 12, 1999 --.

Signed and Sealed this

Twenty-fifth Day of December, 2001

Attest:

Attesting Officer

JAMES E. ROGAN
*Director of the United States Patent and Trademark Office*